Aug. 7, 1962  H. E. KOERNER ETAL  3,048,696
SPOTFILM DEVICE

Filed Oct. 29, 1959  3 Sheets-Sheet 1

WITNESSES
Edwin E. Bassler
James F. Young

INVENTORS
Harry E. Koerner &
Lawrence E. McCanna
BY
D. J. Stratyff
AGENT

Aug. 7, 1962  H. E. KOERNER ETAL  3,048,696
SPOTFILM DEVICE
Filed Oct. 29, 1959  3 Sheets-Sheet 2

Aug. 7, 1962 H. E. KOERNER ETAL 3,048,696
SPOTFILM DEVICE

Filed Oct. 29, 1959 3 Sheets-Sheet 3

United States Patent Office 3,048,696
Patented Aug. 7, 1962

3,048,696
SPOTFILM DEVICE
Harry E. Koerner and Lawrence E. McCanna, Catonsville, Md., assignors to Westinghouse Electric Corporation, East Pittsburgh, Pa., a corporation of Pennsylvania
Filed Oct. 29, 1959, Ser. No. 849,644
6 Claims. (Cl. 250—66)

The present invention relates to spotfilm devices and more particularly to an improved X-ray spotfilm device of the type disclosed in United States Patent No. 2,924,717 issued to Harry E. Koerner et al. on February 9, 1960, and assigned to the assignee of the present application.

In the above-identified patent there is disclosed what hereinafter will be referred to as a front-loading spotfilm device which is adapted for insertion or removal of an X-ray film cassette via a loading aperture in a relatively narrow wall of the device located at its front when the X-ray table is horizontal. While such front-loading spotfilm device possesses advantages over prior spotfilm devices, a certain degree of care and effort is required on the part of the radiologist to maintain the film cassette properly aligned during loading of such cassette through the loading aperture. This becomes significant particularly when the film cassette is being introduced lengthwise while the spotfilm device extends vertically in an upright tilted position of the X-ray table.

In view of the foregoing remarks, it becomes a prime object of the present invention to provide an improved front-loading spotfilm device which overcomes the shortcomings set forth above.

It is another object of the present invention to provide an improved front-loading spotfilm device having means for automatically aligning the film cassette during insertion of same through the loading aperture, irrespective of the attitude of such spotfilm device and of any misalignment which may be introduced on the part of the radiologist employing the equipment.

A still further object of the present invention resides in the provision of an improved front-loading spotfilm device which may be loaded and unloaded with a film cassette with a minimum degree of attention on the part of the radiologist.

Another object of the present invention resides in the provision of an improved front-loading spotfilm device to and from which the film cassette may be loaded and unloaded by the radiologist while wearing the usual relatively-cumbersome lead-shielded gloves.

Other objects and advantages of the invention will become apparent from the following detailed description thereof when taken in connection with the accompanying drawings, in which.

While the spotfilm device embodying the invention is referred to herein as front-loading, this is somewhat arbitrary since the wall referred to as being the front wall of the device in the horizontal attitude of the device and associated X-ray table might more appropriately be referred to as a side wall of the device when such device and table are tilted upright, due to a shift in position of the radiologist relative to the spotfilm device in the different attitude of table and spotfilm device. Such relative terms as "front," "bottom," "side," "back," etc. employed herein are appropriate with reference to the device when in its horizontal attitude and have been employed in this manner in behalf of simplifying description of the invention.

Figure 1:
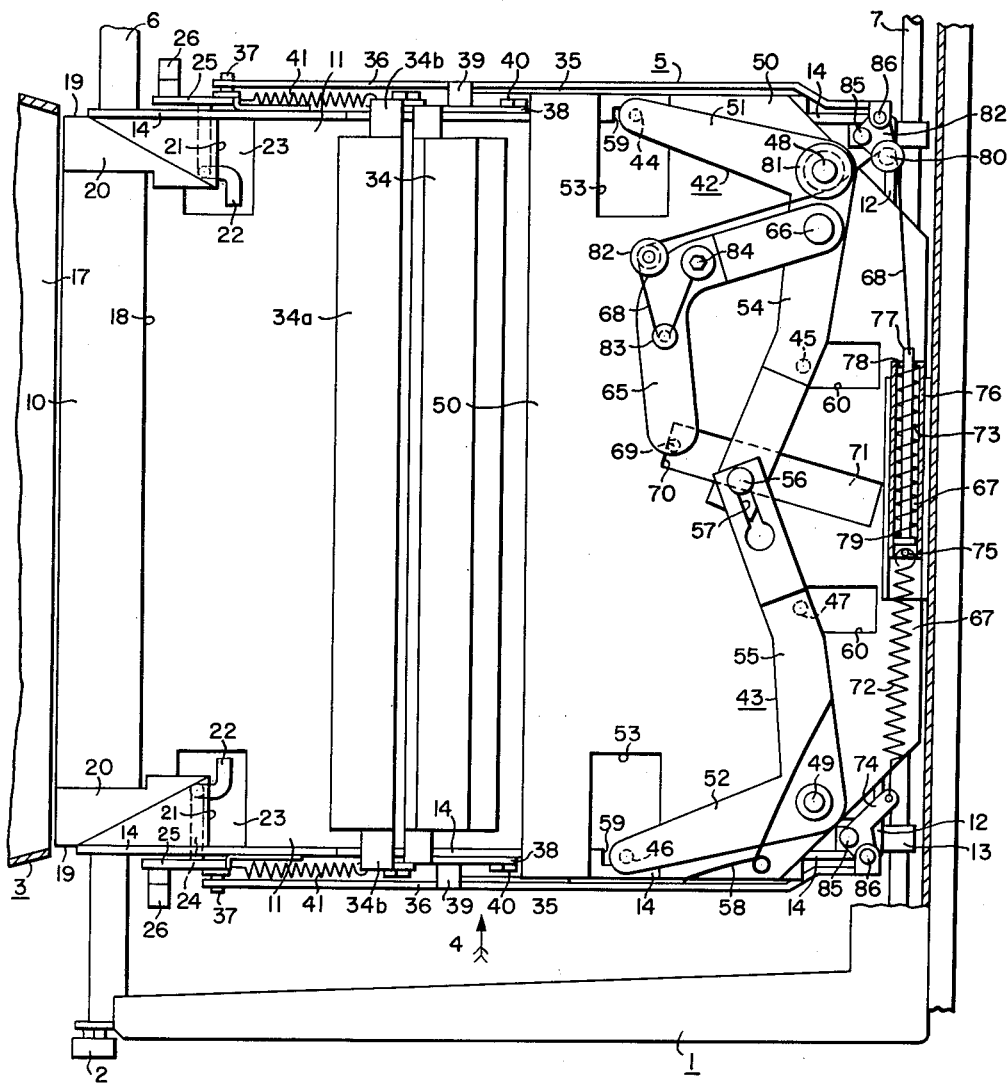
FIGURE 1 is a showing in outline of the novel components of a film cassette carriage as such components appear in the non-loaded stage of the improved front-loading spotfilm device embodying the invention.
Figure 2:
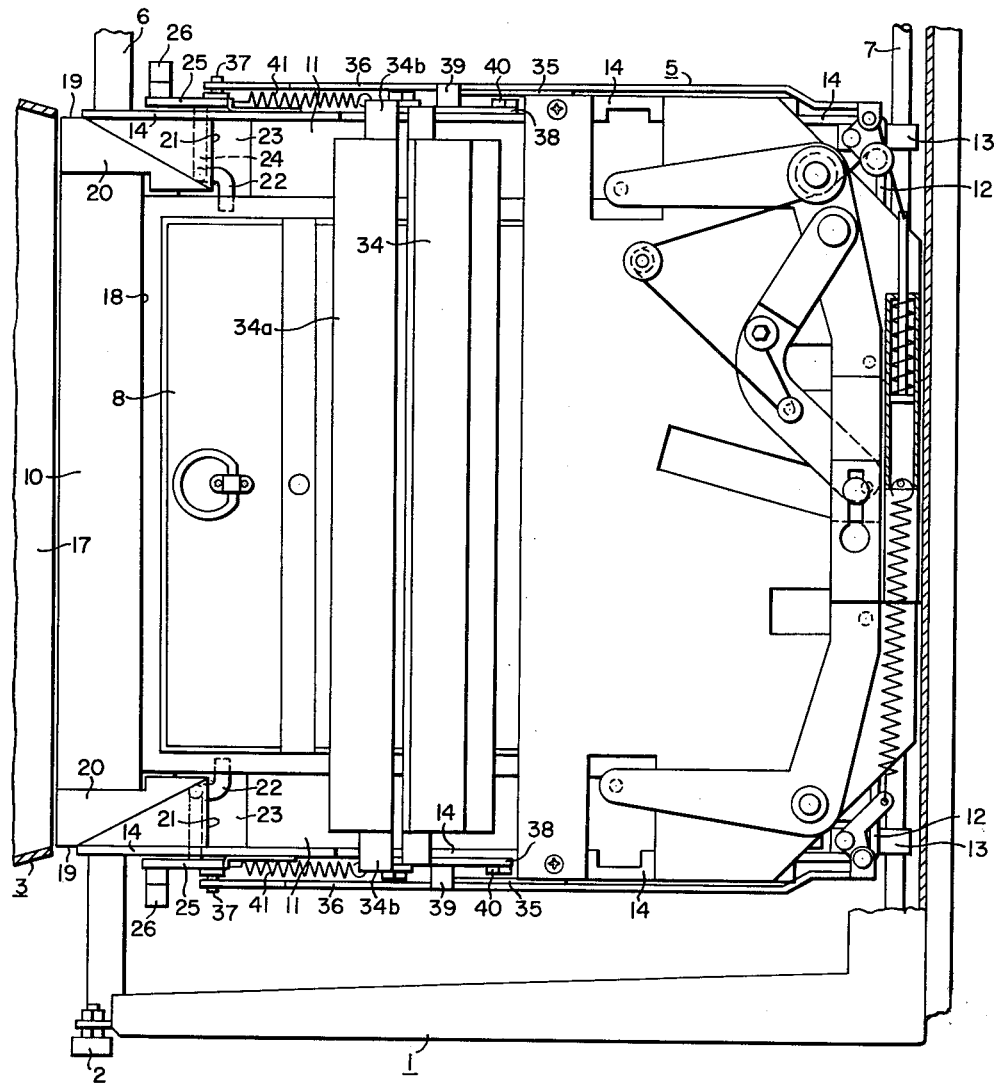
FIG. 2 is a similar view showing the film carriage components in the positions which they assume when the film cassette is fully inserted and the spotfilm device is loaded.

In the drawings, identical components in the several figures bear like reference numerals. Referring to FIGS. 1 and 2 in the drawings, the spotfilm device embodying the invention will comprise the usual carriage 1 adapted by means of rollers 2 (one of which is shown) for reciprocable movement within the housing 3 (only a fragmental front portion thereof being shown) from a loading position adjacent to the front of the housing 3. The carriage 1, per se, may take any well-known form insofar as the present invention is concerned. A subcarriage 5, incorporating novel features of the invention, is mounted for sliding movement on guide members 6 and 7 attached to the carriage 1 to provide the usual cross-travel movement of a film cassette 8 (FIG. 2) transversely of movement of the carriage 1 relative to the housing 3, in the well-known manner, to provide the usual four-on-one and two-on-one film exposure techniques.

The subcarriage 5 is of generally tray-shaped configuration having a front channel member 10 which is in slidably guided cooperation with the guide member 6 of the carriage 1, a bottom 11 (FIGS. 1 and 4), a rear wall 12 to which is attached transversely spaced apart bearing elements 13 in slidably guided cooperation with the guide member 7 of the carriage 1, and side walls 14. An upper surface 15 of the front member 10, as viewed in FIG. 4, for example, is adapted for disposition within aperture 17 formed in the front of the housing 3. Surface 15 of member 10 is offset from the bottom 11 to provide a shoulder 18 against which the film cassette 8 abuts when fully inserted into the subcarriage 5 in a lengthwise attitude, as shown in FIG. 2. Members 19 at opposite ends of the member 10 adjacent to side walls 14 are provided which have tapered surfaces 20 extending into intersection with the surface 15 of the member 10 as an aid in guiding the film cassette 8 during introduction into the subcarriage and have shoulders 21 extending in a direction upwardly of the bottom wall 11 and parallel to the shoulder 18 for retaining contact with the side edge of the film cassette 8 when fully inserted into the subcarriage 5 in a sidewise attitude (not shown).

Associated with the members 20 are respective cassette lift fingers 22 which are normally disposed in a recess 23 formed in the bottom 11 of the subcarriage 5 for extension under the film cassette 8 when loaded in the subcarriage 5 either in its lengthwise attitude as shown in FIG. 2 or in the widthwise attitude (not shown) in location by the shoulders 21. In accord with the feature of the invention the cassette lift fingers 22 are arranged to be actuated through the medium of a respective shaft 24, extending through member 19 and the side wall 14 of subcarriage 5, a lever 25, a roller 26 carried thereby, a cam 27 which engages roller 26 when the subcarriage 5 is in its loading position in which it is shown in the drawings, a manually actuated lever 28 attached to cam 27 and pivotally connected at 29 to a portion of the housing 3 and extending outwardly through the loading aperture 17 in the front of such housing, and an operator's handle 30 extending transversely across the aperture 17 between respective ends of the levers 28, as may be seen in FIGS. 3 and 4. By virtue of this arrangement, as hereinafter will become apparent, the glove hand of a radiologist may be partially inserted into the tapered loading apertures 17 with the thumb acting to depress the handle 30 for rocking the lever 28 about the pivot at 29 to cause depression of the cam 27, FIG. 4, and thereby rocking movement of the lever 25 for causing the lift fingers 22, FIG. 2, to raise the film cassette away from the bottom 11 of subcarriage 5 to free such cassette from the shoulder 18 or shoulders 21, as the case may be, whereupon, ejection means (to be described herein subsequently) causes ejection of the film cassette 8 into the open hand of the operator, FIG. 3. Thereafter the operator or radiologist may easily withdraw the film cassette outwardly through aperture 17. Bias means in the form of such as a tension spring 31, FIG. 4, is provided one or more of the levers 28 to urge same to a repose position in engagement with a stop shoulder 32 and thereby define the inactive position of handle 30 in which it is shown in FIG. 4.

According to a further feature or features of the invention, a cassette hold-down member 34 is provided which extends transversely across the top of the subcarriage 5 between side walls 14 and parallel to the bottom 11 to urge the film cassette when slid therebehind toward the bottom 11 as an assist in causing such cassette to slide behind the retaining shoulder 18 or shoulders 21, as the case may be, during the final stages of such insertion, as well as to aid in retaining such cassette in place, particularly when the spotfilm device embodying the subcarriage 5 is in a vertical attitude. The novel hold-down arrangement includes a means for raising such hold-down member 34 away from the film cassette during actuation of the cassette lift fingers 22 to free such film cassette from the influence of the retaining shoulder 18 or shoulders 21, as the case may be. This is accomplished through the medium of respective cams 35 at each end of the member 34 which are actuated by respective link members 36 pivotally connected at 37 to the respective levers 25 for actuation simultaneously with lift fingers 22, as previously described. Actuation of each cam 35 causes lifting of a respective support member 38 attached to a corresponding end of retaining or hold-down member 34 through the medium of a cam follower 39 attached to support member 38. Cam 35 is attached to its respective link member 36 by means such as rivets (not shown) and each support member 38 for the member 34 is pivotally connected at 40 to a portion of the respective side wall 14 of subcarriage 5. A tension spring 41 is provided each of such support members 38 to urge same in the direction of bottom 11 of subcarriage 5, one end of the tension spring being anchored to a portion of the adjacent side wall 14.

Associated with the hold-down member 34 is a cassette-directing member 34a pivotally mounted at opposite ends via arms 34b and pins 34c to hold-down member 34. Springs 41 are directly connected to arms 34b to serve as a yieldable bias means permitting member 34a to move upwardly, as viewed in FIG. 4, relative to member 34 upon contact with the forward end of the film cassette during insertion into subcarriage 5 to expose a tapered undersurface 34d and thereby direct, guide, and facilitate continued inserting movement of such cassette beneath hold-down member 34 which is consequently also lifted against opposition of springs 41 through the medium of arms 34b. The arms 34b have portions extending across the support members 38 which contact these members to define the repose position of cassette-directing member 34a in which it is shown in FIG. 4.

According to a prime feature of the invention, a means including crank levers 42 and 43 with pins 44, 45, 46 and 47 is provided to effect centering alignment of the film cassette 8 during lengthwise loading of the film cassette 8 into the subcarriage 5. Levers 42 and 43 are pivotally connected at rotary joints 48 and 49, respectively, to the subcarriage 5 through the medium of a plate member 50 extending across the top of the subcarriage 5 and secured at opposite ends to the side walls 14 thereof. Referring to FIG. 1 in the drawings, levers 42 and 43 comprise arms 51 and 52, respectively, extending generally along the side walls 14 of the subcarriage and carrying the pins 44 and 46, respectively, which project from such arms through respective openings 53 in plate member 50 toward the bottom member 11. Levers 42 and 43 also include arms 54 and 55 which span the width of the subcarriage 5 and are interconnected through the medium of a sliding pivot joint comprising a pin 56 secured to arm 54 and a slot 57 formed in the arm 55. Bias means in the form of a wire spring 58 in cooperation with the arm 55 urges the lever 43 to a repose position in which the pin 46 is disposed in a slot 59 formed in the respective side wall 14. Through the medium of the slot 57 in arm 55 and the pin 56 carried by the arm 54, the corresponding lever member 42 is urged to a corresponding repose position in which the pin 44 is disposed in a corresponding slot 59 in the respective side wall 14. Pins 45 and 47 are carried by arms 54 and 55 of levers 42 and 43, respectively, and these pins project downwardly therefrom in the direction of bottom 11 of the subcarriage 5 through respective openings 60 in plate member 50.

During longitudinal insertion of a film cassette through the loading aperture 17 at the front of the housing 3, in assist by cassette-directing member 34a, the forward end of such film cassette will be made to slide along the bottom 11 of the subcarriage 5 and under the hold-down or retaining member 34 which will be raised upwardly by the cassette while maintaining its lower front edge in sliding contact with the bottom 11 during continued insertion of such cassette through aperture 17 into subcarriage 5. No particular care need be exerted on the part of the operator or radiologist during such insertion of the film cassette into and through the loading aperture 17 and it may be assumed that under the majority of circumstances such film cassette initially will be somewhat misaligned with respect to the side walls 14 of subcarriage 5. Under these circumstances the forward edge of the film cassette will be brought into contact with one or the other of pins 45 or 47, FIG. 1, while the operator continues to shove the film cassette into the subcarriage 5. As such continued movement of the film cassette progresses, by virtue of the engagement of its forward edge with one or the other of pins 45 or 47, the levers 54 and 55 are caused to move pivotally about their rotary joints 48 and 49, respectively, to cause their respective arms 51 and 52 to swing inwardly and bring respective pins 44 and 46 consecutively into engagement with the side edges of the spotfilm device while shifting position of the forward edge thereof to bring the same into and locate same in a mid-position equidistant to side walls 14. During the final stages of movement of the film cassette 8 into the subcarriage 5, both pins, FIG. 2, 44 and 46 as well as both pins 45 and 47, will be in engagement with the film cassette 8 at its sides and rear while the forward edge of the film cassette slides behind the retaining wall 18. During such shifting of the forward end of the film cassette bringing same into automatic alignment with the subcarriage, the rearward end of the film cassette is maintained against any gross misalignment by virtue of its contact with the tapered surfaces 20 of members 19, so that upon completion of movement of the film cassette into the subcarriage 5 the rearward end will readily drop into place behind the shoulder 18.

Figure 3:
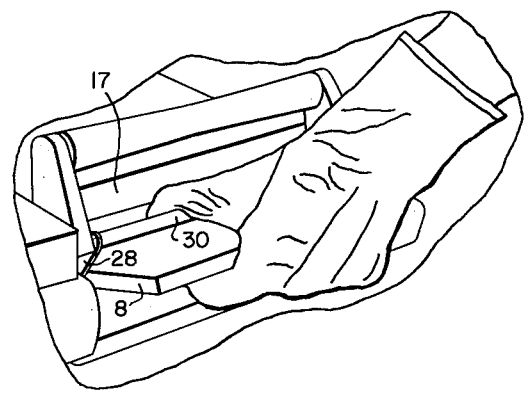
FIG. 3 is a perspective view showing a portion at the front of the spotfilm device in the vicinity of the loading aperture.
Figure 4:
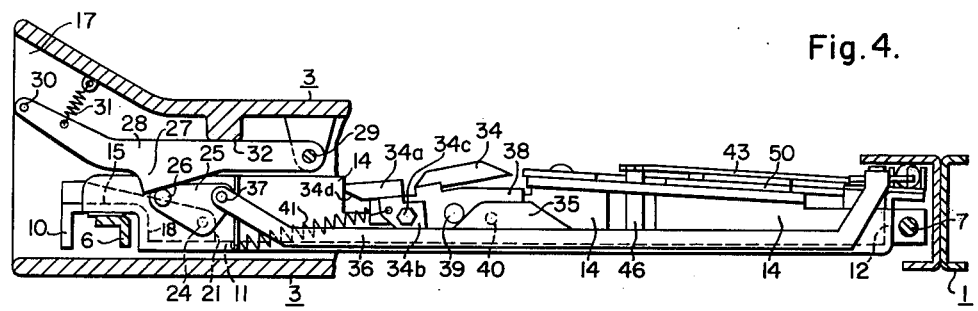
FIG. 4 is a view taken in the direction of the arrow 4 in FIG. 1 showing details of certain components included in the FIG. 1 showing as well as further details significant with respect to an understanding of the FIG. 3 showing.

In accord with additional features of the invention, the subcarriage 5 comprises means for moving the film cassette 8 outwardly into the loading aperture 17 upon actuation of the cassette lift fingers 22 by manipulation of the operator's handle 30, FIG. 3 and FIG. 4, to free the forward edge of such cassette from the shoulder 18 or shoulders 21, as the case may be. Such means includes an arm 65 which is pivoted at a pin connection 66 to the arm 54 of lever 42 adjacent to the rotary joint 48, and is biased by spring means 67 through the medium of a flexible cable or cord element 68 toward rocking movement in a clockwise direction as viewed in the drawings to forwardly bias a cassette ejection pin 69 carried by such arm. In the unloaded condition of the subcarriage 5, the pin 69 is urged into engagement with a stop shoulder 70 in one end of a slot 71 formed in the plate 50 through which the pin 69 extends downwardly in the direction of bottom 11 of such subcarriage, the slot 71 permitting travel of the pin 69 when engaged by the forward end of the film cassette during its insertion into the subcarriage 5. The spring means 67 includes a tension spring 72 connected in series with a compression spring 73. One end of the tension spring 72 is anchored to an arm of a bell crank element 74, while the opposite end of such tension spring is anchored at 75 to an end of a cylindrical housing 76 in which the compression spring 73 is disposed. Compression spring 73 encircles a spring rod 77 extending inwardly of the housing 76 and abuts at one end an annular end wall 78 of such housing and at its opposite end an annular shoulder 79 formed in one end of such spring rod. An outermost end of spring rod 77 is attached to one end of the flexible cable element 68 which passes around a pulley 80 carried by link 82, is looped around a pulley 81 associated with the rotary joint 48 extends around a pulley 82 carried by plate member 50, extends therefrom around a pulley 83 carried by arm 65, and is anchored at 84 to such arm.

In operation of the cassette ejecting means, the forward edge of the film cassette 8 during insertion into the subcarriage 5 will engage the pin 69 causing same to move along the slot 71 in plate member 50 while the arm 65 rotates or turns in a counterclockwise direction as viewed in the drawings about the pin connection 66 as a pull is exerted on the cable or cord element 68 causing the spring rod 77 to be withdrawn outwardly through the housing 76 to assume the position in which it is shown in FIG. 2 and causing compression of the spring 73 and extension of the tension spring 72. In accord with the feature of the invention for reasons which will hereinafter become apparent, the two springs 73 and 72 are of different pick-up value so that during insertion of the film cassette 8 into the subcarriage 5 the compression spring 73 first will become fully compressed before the housing 76 is caused to move and further stretch the tension spring 72 of higher pick-up value.

According to a further feature of the invention, link element 82 and bell crank element 74 remain disposed in the positions in which they are shown in the drawings during insertion of the film cassette 8 into subcarriage 5. In such positions of these elements, the end of the bell crank element 74 to which one end of the spring 72 is connected and the corresponding end of the element 82 to which the pulley 80 is connected will be disposed in inwardly extending directions in which they are shown in the drawings. Each of elements 74 and 82 are connected by respective pins 85 to respective portions of the side walls 14 and each is adapted to be actuated pivotally about its respective pin 85 by the respective link members 36 through the medium of respective pivot connections 86 joined to the ends of such members 36.

In ejection operation by manipulation of the operator's handle 30, FIGS. 3 and 4, to effect actuation of the cassette lift fingers 22 and raising of the cassette hold-down member 34, as previously described herein, the simultaneous operation of the link members 36 will cause simultaneous turning movements of elements 74 and 82 about pins 85 to cause pulley 80 associated with element 82 and the end of crank element 74 attached to tension spring 72 to move further away from one another and thereby further stretch the relatively heavy tension spring 72 to cause the pin 69 to exert a greater force on the end of the film cassette 8 than was exerted by such pin during insertion of the film cassette. Once the film cassette 8 has been lifted free of the shoulder 18 by upward movement of the lift fingers 22, such increased effort of the pin 69 from the rearward edge of the film cassette will advance same rapidly across the upper surface 15 of subcarriage member 10 at the loading aperture 17 under influence of the tension spring 72. Upon completion of a certain degree of such initial movement of the film cassette across member 10 in the direction of aperture 17, the lighter compression spring 73 will re-expand to cause the film cassette to complete its outward movement into the mouth of the loading aperture 17 with a final rate of movement which is relatively slow and calculated to merely place the outer end of such film cassette into the gloved hand of an operator as shown in FIG. 3 and to prevent complete ejection of the film cassette outwardly through the opening 17 in the event that the operator's hand is not present, or is not suitably positioned to receive the cassette.

The spacing of the side walls 14 of subcarriage 5 is such that, in the well-known manner, the film cassette 8 may be introduced into the subcarriage 5 either lengthwise or widthwise, as preferred. Introduced widthwise into the film cassette, same is slid over the elements 19 at the edges of member 10 until it drops down behind the retaining shoulders 21. During such widthwise insertion of the film cassette the aligning and gathering action of the levers 42 and 43 with their associated pins as previously described in detail is not relied upon, but it is arranged in the illustrated embodiment disclosed herein that pins 45 and 47 will be contacted by the rearward edge of the film cassette during the final stage of widthwise insertion to cause the pins 44 and 46 to be brought into engagement with such film cassette to lock same in place against any movement which might tend to disturb it, as in raising the spotfilm device from a horizontal to a vertical position, for example. The spring means 67, however, is loaded in the manner as previously described by movement of the pin 69 in slot 71 during such widthwise insertion of the film cassette. Removal of the widthwise-inserted film cassette 8 is effected in substantially the same manner as previously described by manipulation of the operator's handle 30 to raise the lift fingers 22 and cassette hold-down member 34 to free such cassette from the shoulders 21 while the spring means 67 causes movement of such film cassette into the loading aperture 17 in the manner also previously described.

Upon removal of the film cassette from the spotfilm device outwardly through aperture 17 and release of the operator's handle 30, components of the subcarriage 5 will return to their respective positions in which they are shown in FIGS. 1 and 4 of the drawings.

While the invention has been described herein with a certain degree of particularity, it will be appreciated that various modifications are intended to be covered without departing from the spirit and scope of such invention except as defined by the following claims.

We claim as our invention:

1. In a spotfilm device, the combination of a housing having a wall with a cassette loading aperture opening therethrough, cassette carriage means within said housing movable to and from a cassette loading position in proximity of said loading aperture, cassette actuating means operable to dislodge a film cassette from said carriage means and to advance same longitudinally outward into said loading aperture, and means including a manually-operated control member secured for retainment on said device and disposed in proximity to said loading aperture to effect operation of said cassette actuating means whereby the film cassette will be moved into the operator's hand when positioned to operate said member.

2. In a spotfilm device, the combination of a housing having a wall with an elongated cassette loading aperture opening therethrough, cassette carriage means within said housing having a position in which a film cassette carried thereby is disposed in alignment with said loading aperture, cassette actuating means operable to dislodge a film cassette from said carriage means and to advance same edgewise outwardly into said loading aperture, and means including an elongated operator's handle secured for retainment on said device and extending across said loading aperture to effect operation of said cassette actuating means whereby the film cassette will be moved between an operator's fingers and his thumbs while the latter is positioned to actuate said handle.

3. In a spotfilm device, the combination of a housing having a wall with a cassette loading aperture opening therethrough to permit passage of a film cassette therethrough, cassette carriage means within said housing adapted to loosely receive a rectangular film cassette inserted edgewise through said loading aperture for transit in a particular position on said carriage means, and cassette aligning means including movable cassette-contacting elements responsive to insertion effort delivered to a film cassette while being so inserted to cause such cassette to assume said particular position irrespective of any misalignment introduced or tended to be caused by the operator effecting the insertion.

4. In a spotfilm device, the combination of a housing having a wall with a cassette loading aperture opening therethrough to permit passage of a film cassette therethrough, cassette carriage means within said housing adapted to loosely receive a rectangular film cassette inserted edgewise through said loading aperture for transit in a particular position on said carriage means, and cassette aligning means including pivotally-movable crank lever means operable by the forward edge of a misaligned film cassette to exert a transverse shifting effort on such cassette to direct same to said particular position during its continued insertion.

5. In a spotfilm device, the combination of cassette carriage means adapted to receive a film cassette introduced by edgewise movement to a loaded position for transit defined by engagement of the trailing edge of such cassette with a retaining shoulder extending transversely and perpendicularly of the direction of such edgewise movement, bias means overcome by cassette movement during loading into said carriage means for urging said cassette in a carriage unloading direction toward said retaining shoulder, and means including an operator's handle operable to move said cassette free of said shoulder while increasing exertion of said bias means thereon for moving said cassette edgewise in said carriage unloading direction.

6. In a spotfilm device, the combination of cassette carriage means adapted to receive a film cassette introduced by edgewise movement to a loaded position for transit defined by engagement of the trailing edge of such cassette with a retaining shoulder extending transversely and perpendicularly of the direction of such edgewise movement, bias means overcome by cassette movement during loading into said carriage means for urging said cassette in a carriage unloading direction toward said retaining shoulder, yieldable cassette hold-down means on said carriage means which acts in opposition to movement of said cassette from its loaded position in engagement with said retaining shoulder, and actuating means including an operator's control member operable to displace said holddown member away from said cassette while moving the latter free of said retaining shoulder to permit said bias means to move said cassette in the carriage unloading direction.

References Cited in the file of this patent
UNITED STATES PATENTS

| | | |
|---|---|---|
| 2,327,603 | Kizaur | Aug. 24, 1943 |
| 2,560,782 | Scholz | July 17, 1951 |
| 2,900,514 | Boucher | Aug. 18, 1959 |
| 2,921,202 | Berger | Jan. 12, 1960 |
| 2,924,717 | Koerner | Feb. 9, 1960 |